APPARATUS FOR FASTENING LEADS TO AN ELECTRICAL COMPONENT

INVENTOR
J. C. McCONNELL
By D. W. Marks
ATTORNEY

United States Patent Office 3,452,417
Patented July 1, 1969

3,452,417

APPARATUS FOR FASTENING LEADS TO AN ELECTRICAL COMPONENT

James C. McConnell, Winston-Salem, N.C., assignor to Western Electric Company, Incorporated, New York, N.Y., a corporation of New York Filed Mar. 3, 1967, Ser. No. 620,335
Int. Cl. H01r *11/08*
U.S. Cl. 29—203 9 Claims

ABSTRACT OF THE DISCLOSURE

One end of a wire is inserted through a hole in an electrical component. The leading end of the wire is bent and held against the component whereupon the wire is severed and the trailing end of the severed wire is bent to secure the wire to the component and form a lead extending from the component.

BACKGROUND OF THE INVENTION

Electrical components such as film resistors, capacitors, etc., are manufactured on small, flat, rectangular substrates which have holes formed in the ends thereof for the purpose of attaching electrical leads. An electrical connection between a lead and a conductive film on the substrate must be strong enough to withstand the bending of the lead when the component is connected to an electrical assembly. Having the lead pass through a hole in the substrate protects the electrical connection as the stress created by bending the lead is applied to the substrate at the edge of the hole.

Prior art techniques for inserting and fastening the leads incorporate processes or manual manipulations which are unsuitable for large volume manufacture of such components.

SUMMARY OF THE INVENTION

Accordingly, an object of this invention is an improved apparatus for attaching electrical leads to electrical components.

With these and other objects in view, the present invention contemplates the advancement of one end of a wire beyond a surface of an electrical component with the subsequent bending and holding of the leading end of the wire against one surface of the component. The wire is severed and the trailing end of the severed wire is bent against another surface of the component to clinch the wire to the component. The wire contacts a conductive film on the component and one end of the severed wire extends from the component to form a conductive lead.

DETAILED DESCRIPTION

Figure 1:
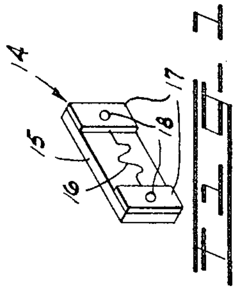
FIG. 1 shows a typical film electrical component.

Referring first to FIG. 1, there is shown a film component 14, such as a resistor, having a substrate 15 with a tantalum nitride resistance path 16 formed thereon. Conductive films 17 are plated by evaporation on the ends of the resistive path 16 to provide an electrical connection thereto. Holes 18 extend through the conductive coating 17 and the substrate 15.

Figure 2:
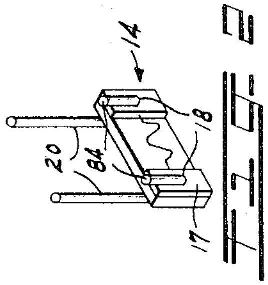
FIG. 2 shows the electrical component of FIG. 1 having two leads attached in a radial configuration thereto.
Figure 3:
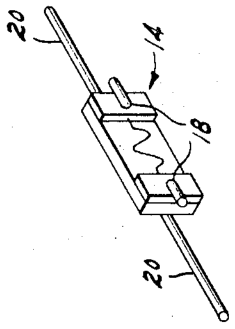
FIG. 3 shows the electrical component of FIG. 1 having two leads attached in an axial configuration thereto.

In FIG. 2, the component 14 is shown with leads 20 extending in a radial configuration from the electrical component 14. In FIG. 3, leads 20 extend in an axial configuration from the electrical component 14.

Figure 4:
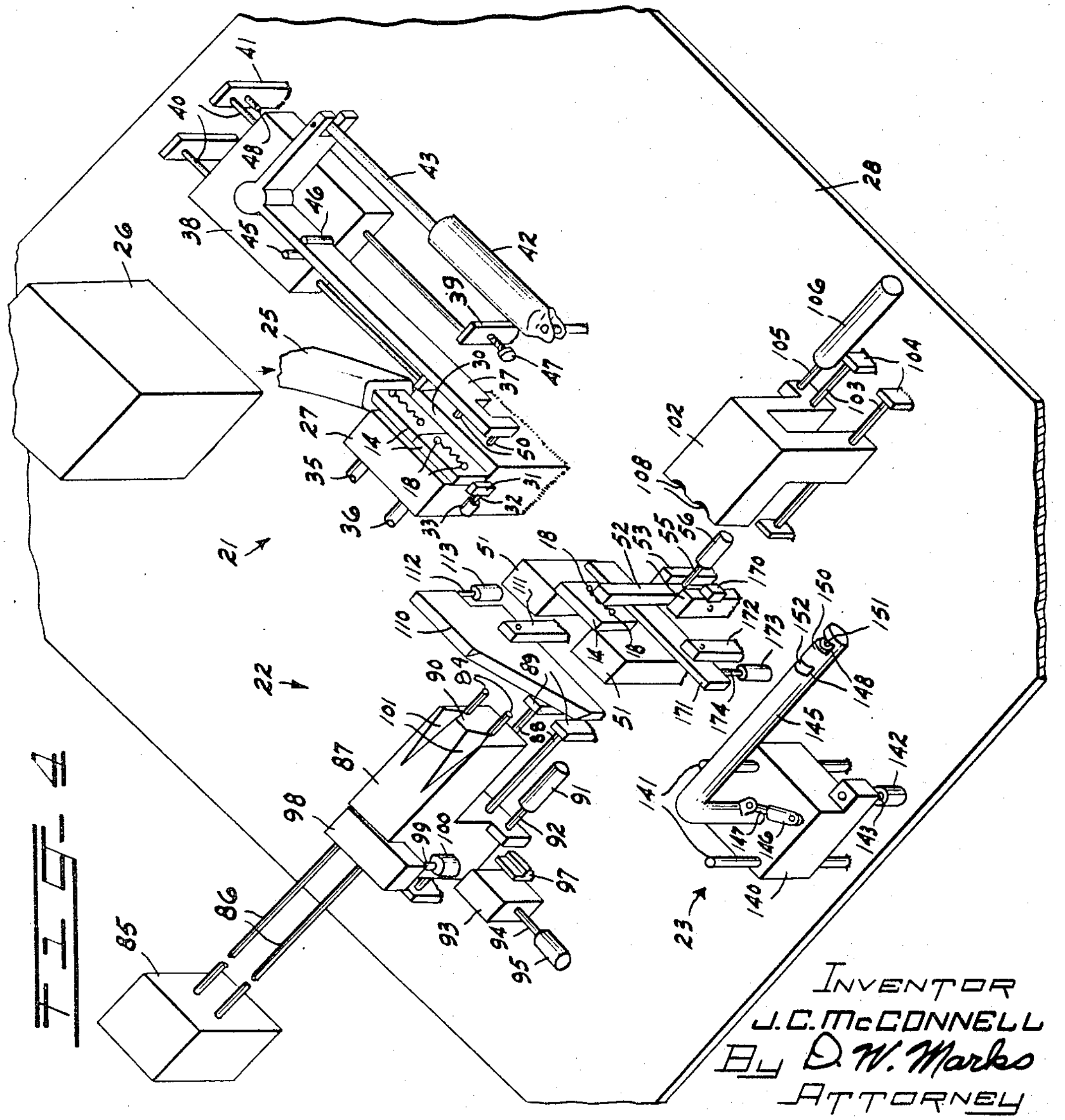
FIG. 4 is an isometric view of a machine for attaching the leads to the electrical component in the radial configuration shown in FIG. 2.

Referring now to FIG. 4, there are shown a loading transfer mechanism 21, a lead fastening mechanism 22, and an unloading transfer mechanism 23. The loading mechanism 21 sequentially transfers the components 14 to the lead fastening mechanism 22 where the leads 20 (FIG. 2) are fastened to the components 14 in the radial configuration. The unloading mechanism 23 transfers the components 14 with leads 20 to a conveyor (not shown) which subsequently dips the components in a solder bath to solder the leads 20 to the respective conductive films 17 (FIG. 2).

LOADING TRANSFER MECHANISM 21

*a. Mechanical description*

As shown in FIG. 4, a rectangular tube 25 is connected between an orienter 26 and a positioning block 27 mounted on a table 28. The orienter 26 feeds the components 14 into the tube 25, such that the conductive films on the components are facing in the same direction. The weight of the components 14 in the tube 25 pushes the leading components onto a ledge 30 of the positioning block 27 where they are stopped by a movable abutment 31 connected to a piston 32 and air cylinder 33 mounted on the block 27. Vacuum lines 35 and 36 communicate with holes (not shown) in the block 27 behind the leading two components 14 for holding the components 14 on the block 27 when the piston 32 retracts the abutment 31.

Alternately, the air cylinder 33 and piston 32 may be eliminated by spring mounting the abutment 31 on the block 27 such that the abutment moves out of the path of the component 14 when force is applied to the component to move it from the block 27.

An L-shaped arm 37 is pivotally mounted on a carriage 38 which is slidably mounted on rods 40, connected to brackets 39 and 41, on the table 28, for transferring the leading component 14 from the block 27 to the lead fastening mechanism 22. Friction pads (not shown) in the carriage 38, retard the sliding movement of the carriage 38 on the rods 40. An air cylinder 42, pivotally attached to the table 28, has a piston rod 43 pivotally connected to one end of the arm 37 for rotating the arm 37 and sliding the carriage 38 on rods 40. Stops 45 and 46 on the carriage 38 limit the rotation of the arm 37 while stops 47 and 48 on the brackets 39 and 41, respectively, limit the sliding movement of the carriage 38. Pins 50 which are attached to the other end of the arm 37 are inserted into the holes 18 of the leading component 14 on the block 27 when the arm 37 is rotated against the stop 45. Continued movement of the piston rod 43 moves the carriage 38 against the stop 47 to position the leading component 14 in the lead fastening mechanism 22.

In the lead fastening mechanism 22, holding members 51, mounted on the table 28, cooperate with a finger 52 pivotally mounted on brackets 53 on the table 28 to receive a component 14 from the transfer mechanism 21. When the arm 37 and carriage 38 have been rotated and advanced to position a component 14 between the holding members 51 and finger 52, a piston 55 projecting from an air cylinder 56 mounted on the table 28 pivots the finger 52 to clamp the component 14 in the lead fastening mechanism.

Figure 9:
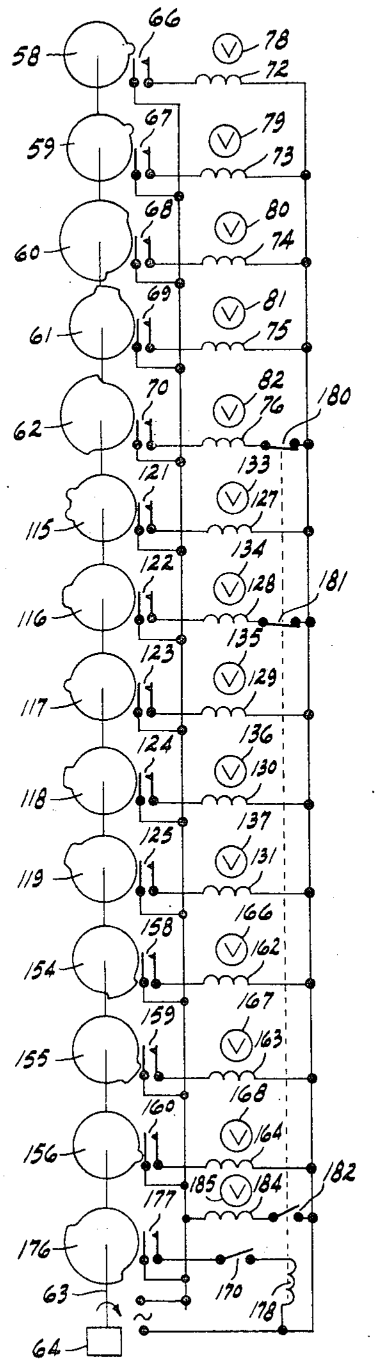
FIG. 9 is a drawing of a control circuit for the machine shown in FIG. 4.

Referring to FIG. 9, there are shown cams 58–62 mounted on a shaft 63 driven by a motor 64 for closing contacts 66–70 to actuate solenoids 72–76 and operate valves 78–82. Valves 78 and 79 control the application of the vacuum to lines 35 and 36. Valves 80–82 control the operation of the respective air cylinders 33, 42, and 56.

*b. Operation*

Figure 10:
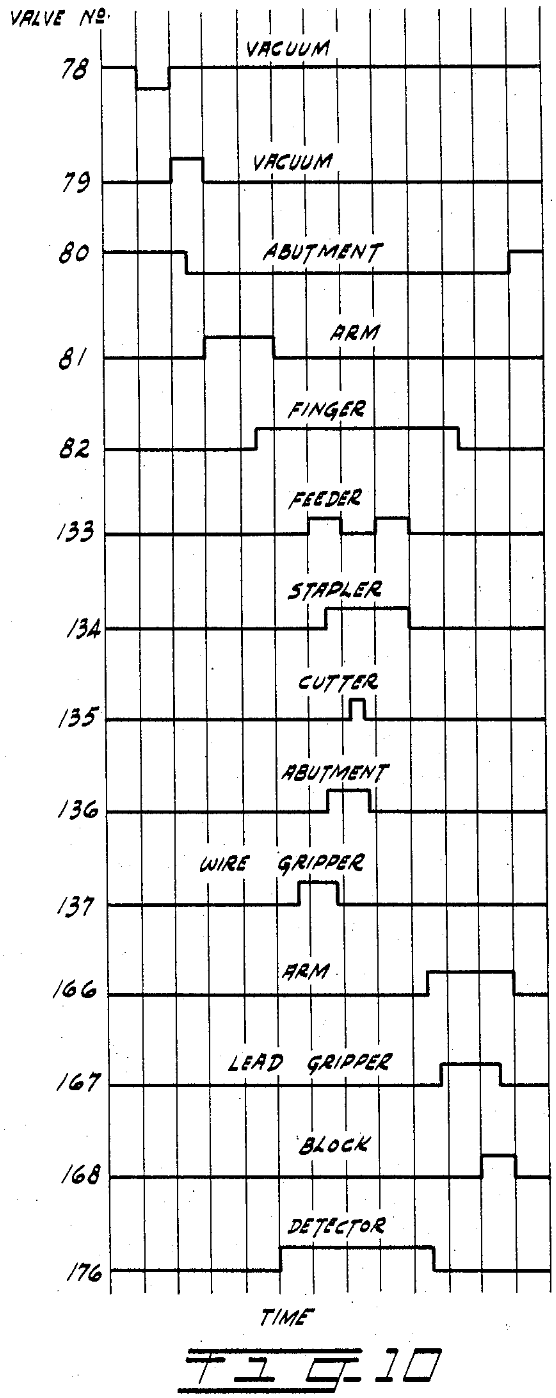
FIG. 10 is a time chart showing the relative times of operation of the respective components of the machine shown in FIGS. 4–9.

Referring to FIG. 10, there are shown time charts of the operation of valves 78–82 which operate the loading transfer mechanism 21. Initially, the abutment 31 is moved into the path of the components 14 on the ledge 30 by the air cylinder 33 and piston 32. Next, the vacuum on line 35 is released to allow the components 14 to feed from the tube 25 and push the leading component 14 against the abutment 31. Vacuum is then reapplied to lines 35 and 36 to hold the leading two components 14 in their positions on the block 27. The abutment 31 is retracted from the path of the components 14 and the air cylinder 42 and piston 43 rotate the arm 37 to insert the pins 50 into the holes 18 of the leading component 14. Continued movement of the piston 43 moves the arm 37 against the stop 45 and slides the carriage 38 on rods 40 against the stop 47 to position the component 14 between the holding members 51 and the finger 52. The air cylinder 56 and piston 55 move the finger 52 to clamp the component in the lead fastening mechanism 22. The vacuum on line 36 is released and the air cylinder 42 and piston 43 rotate the arm 37 away from the component 14 against the stop 46 and slide the carriage 38 against the stop 48. The loading mechanism 21 is now ready for a subsequent cycle of transferring a component 14 to the lead fastening mechanism 22.

LEAD FASTENING MECHANISM 22

*a. Mechanical description*

Referring to FIG. 4, there is shown a wire supply and straightener 85 for supplying two wires 86 to a wire feeder 87 with the leading ends 84 of the wires 86 protruding from a face 90 of the wire feeder 87. The wire feeder is slidably mounted on rods 88 supported between brackets 89 on the table 28. An air cylinder 91 mounted on the table 28 has a piston 92 connected to the feeder 87 for moving the feeder on the rods 88. A movable stop 93 connected to a piston 94 and projecting from an air cylinder 95, is slidably mounted between guides 97 on the table 28 for moving into the path of the feeder 87 to limit its travel. A gripper 98 is connected to a piston 99, projecting from an air cylinder 100, mounted on the feeder 87, for gripping the wires 86. Grooves 101 are formed in the top of the feeder 87.

After the feeder 87 has advanced to insert the wire ends 84 through the holes 18 of the component 14, the ends 84 are bent and held against the conductive films 17 by a stapler 102. The stapler 102 is slidably mounted on rods 103 supported by brackets 104 on the table 28. A piston 105, projecting from an air cylinder 106 secured to the table 28, is connected to the stapler 102 for advancing and retracting the stapler. Anvil surfaces 108 are formed in the face of the stapler 102 for bending and holding the ends of the wire 86 against the component 14, after the ends of the wires 86 have been inserted through the holes 18 by the feeder 87.

A cutter 110 is pivotally mounted on bracket 111 on table 28 for cooperating with the face 90 of the feeder 87 to sever the wires 86 after the feeder 87 has retracted against the movable stop 93. The movement of the cutter 110 is controlled by an air cylinder 113 on the table 28 which has a piston 112 connected to the cutter 110.

Alternately, the abutment 93, air cylinder 95, and piston 94 may be eliminated and the cutter 110 pivotally mounted on a slidable support (not shown) which has an upper member (not shown) for cooperating with the cutter to sever and bend the wires 86. Conventional facilities would advance and retract the cutter and carriage (not shown) into the path of the feeder 87.

Referring to FIG. 9, cams 115–119 close contacts 121–125 to activate solenoids 127–131 and operate valves 133–137. Valves 133–137 operate the respective air cylinders 91, 106, 113, 95, and 100, to control the sequence of operation of the wire fastening mechanism 22.

*b. Operation*

Figure 7:
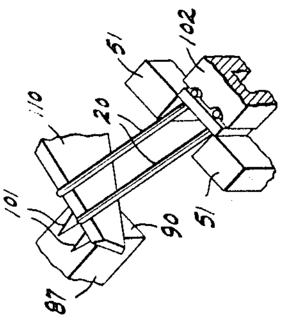
FIGS. 5–8 are isometric views showing different positions of the wire feeding and stapling tools of the machine shown in FIG. 4.
Figure 8:
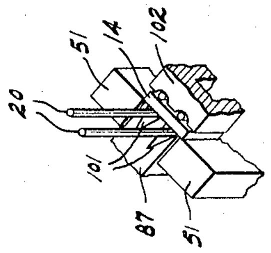
Figure 5:
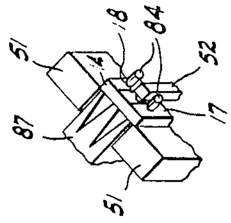
Figure 6:
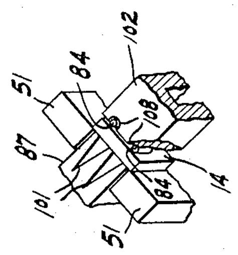

Referring to FIG. 10, there are shown time charts of the operation of valves 133–137 which operate the lead fastening mechanism 22. Initially, the feeder 87 is in its fully retracted position with the wire ends 84 protruding from the face 90. First, the air cylinder 100 closes the gripper 98 on the wires 86, and the air cylinder 91 advances the feeder 87 to insert the wire ends 84 into the holes 18 of the component 14, such that the ends 84 extend from the conductive films 17, as shown in FIG. 5. Next, the air cylinder 106 advances the stapler 102 against the component 14 whereupon the anvil surfaces 108 bend and hold the wire ends 84 against the conductive films 17 on the component 14 as shown in FIG. 6. Then air cylinder 95 advances the movable stop 93 into the path of the feeder 87, whereupon the gripper 98 is released and the feed member 87 retracts against the movable stop 93. While the feeder 87 is in this position, the air cylinder 113 rotates the cutter 110 which cooperates with the face 90 of the feeder 87, to sever the wires 86 and bend the severed ends 20 of the wire 86 away from the face 90 of the feeder 87 as shown in FIG. 7. After the cutter 110 is retracted, the air cylinder 91 again advances the feeder 87 whereupon the severed wires 20 are captured within the grooves 101 on the feeder 87 and bent into an upward position where they are bent against the component 14 by the face 90 of the feeder 87 as shown in FIG. 8. Finally, the air cylinders 95, 91, and 106, retract the movable stop 93, the feeder 87, and the stapler 102 in preparation for another lead fastening operation.

FAILURE OF WIRE INSERTION DETECTOR

In the event that one of the ends 84 of the wire 86 being advanced by the feeder 87 does not enter a hole 18 of the component 14, the non-entering wire will force the component against and move the finger 52 to actuate a failure detector switch 170 to cause the rejection of the severed wires and the component 14.

*a. Mechanical description*

Referring to FIG. 4, the switch 170 is mounted on the bracket 53 and has an arm which senses the position of the finger 52. A rejector arm 171 is pivotally mounted on brackets 172 fastened to the table 28 and an air cylinder 173 mounted on the table 28 has a piston 174 connected to the arm 171 for pivoting the arm 171 to raise the component 14 above the holding members 51.

Referring to FIG. 9, a cam 176 closes a contact 177 to complete a circuit through the switch 170 and a relay winding 178. The relay 178 has normally closed contacts 180 and 181 in series with respective solenoids 76 and 128 for releasing the finger 52 and preventing the advancement of the stapler 102. Normally open contacts 182 of the relay 178 complete a circuit through a solenoid 184 which actuates a valve 185 for operating the air cylinder 173 to raise the arm 171.

*b. Operation*

Referring to the time charts of FIG. 10, the contacts 177 are closed only when the finger 52 is held against the component 14. If the advancing ends of the wire 86 fail to enter the holes 18, the switch 170 is closed to actuate the relay 178 to release the finger 152 and prevent the stapler 102 from advancing against the component 14. Also, the air cylinder 173 is operated to rotate the arm 171 to raise the component 14 above the holding members 51. Now when the feed member 87 retracts against the movable stop 93, and the cutter 110 rotates to sever the wires 86, the component 14 and the severed wires are rejected from the lead fastening mechanism 22. After the rejection of the component 14, the cam 176 causes the return of the arm 171 to its initial position and the feeding mechanism 22 finishes its cycle of operation to return to its initial position.

UNLOADING TRANSFER MECHANISM 23

*a. Mechanical description*

Referring to FIG. 4, a block 140 is slidably mounted on vertical shafts 141 mounted on the table 28. An air cylinder 142 mounted on the table 28 has a piston 143 connected to the block 140 for moving the block 140 on the vertical shafts 141. A bent arm 145 is rotatably mounted on the block 140 upon which an air cylinder 146 is pivotally mounted with a piston 147 pivotally connected to the arm 145 for rotating the arm counterclockwise toward the upwardly projecting leads 20 attached to the component 14 in the lead fastening mechanism 22. Slots 148 are formed in the end of the arm 145 for receiving the leads 20 as the arm 145 rotates. An air cylinder 150 is contained within a tubular portion between the slots 148 and has two projecting pistons 151 and 152 for gripping the leads in the slots 148.

Referring to FIG. 9, cams 62, 154–156 close contacts 70, 158–160 to actuate solenoids 76, 162–164, and operate valves 82, 166–168. The valves 82, 166–168 operate air cylinders 56, 146, 150 and 142 to remove the component 14 with the leads 20 fastened thereto from the lead fastening mechanism 22 and transfer the component 14 to a conveyor (not shown).

*b. Operation*

Air cylinder 146 rotates the arm 145 toward the leads 20 whereupon the leads enter the slots 148. Next, the air cylinder 150 moves the pistons 151 and 152 to grip the leads 120 within the slots 148. Then, the air cylinder 56 releases the finger 52 from the component 14, and the air cylinder 142 raises the block 140 and the arm 145 to insert the projecting leads 20 of the component 14 into a spring clip of the conveyor (not shown). Finally, air cylinders 150, 146, and 142 are operated to release the leads 20 and return the arm 145 and the block 140 to their initial positions.

The conveyor subsequently dips the components into a conventional solder bath (not shown) to solder the bent ends 84 of the leads 20 to respective conductive films 17 (see FIG. 2). Thus, the leads 20 are electrically connected to the component 14 and any subsequent stresses on the leads are applied mainly to the substrate 15 and not to the electrical connections to film 17.

EMBODIMENT FOR FASTENING LEADS TO AN ELECTRICAL COMPONENT IN THE AXIAL CONFIGURATION

Figure 11:
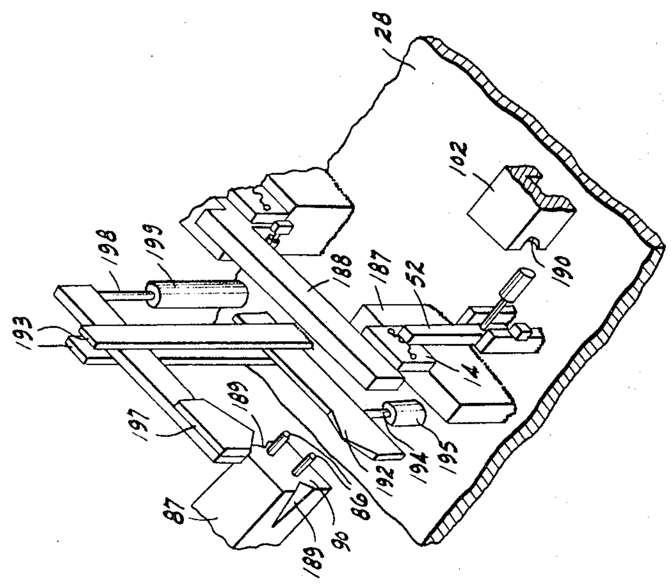
FIG. 11 is an isometric view of the parts which are changed in the machine shown in FIG. 4 to allow the fastening of the leads to the component in the axial configuration as shown in FIG. 3.

Referring to FIG. 11, there are shown the parts of the lead fastening mechanism 22 of FIG. 4, which are changed in order to fasten the leads 20 to the component 14 in the axial configuration of FIG. 3. The components 14 are fed by the loading mechanism 21 of FIG. 4 between the finger 52 and a lower holding member 187 and an upper holding member 188. The feeding member 87 has grooves 189 formed on opposite sides thereof and the stapler 102 has anvil surfaces 190 formed on opposite sides thereof. A cutter bar 192 is pivotally mounted on brackets 193 on the table 28 and controlled by a piston 194 projecting from an air cylinder 195 mounted on the table 28 for cooperating with the face 90 of the feeder 87 to sever the wires 86. A wire spreader 197 is also pivotally mounted on the brackets 193 and controlled by a piston 198 projecting from an air cylinder 199 mounted on the table 28. Both the cutter 192 and wire spreader 197 are V-shaped to cooperate with each other to spread the wires 86 to opposite sides of the feeder 87. Grooves 189 capture the spread wires as the feeder 87 advances to bend the leads 20 in the axial configuration.

If it is desired to manufacture both components with leads having radial configurations of FIG. 2, and components with leads having the axial configuration of FIG. 3, it may be economical to manufacture only components with leads projecting in one of the configurations and to bend the leads on the desired number of components to the other configuration.

It is to be understood that the above-described embodiments are simply illustrative of the principles of the invention and that many embodiments may be made without departing from the spirit and scope of the invention.

What is claimed is:

1. An apparatus for forming a lead on a film component which has a conductive film on one surface thereof, comprising:
   - means for supporting the component;
   - a feeding and bending member having means for gripping a conductive strand such that one end of the conductive strand extends from a face of the member;
   - means for advancing and retracting the member relative to the component supporting means such that upon the first advancement thereof, the one end of the conductive strand extends beyond a surface of the component in the supporting means;
   - means actuated after the first advancement of the member for bending and holding the one end of the wire against the component; and
   - means actuated upon the retraction of the member after the first advancement thereof for severing the wire and bending the severed section of wire away from the face of the member such that upon a second advancement of the member the face of the member engages and bends the severed section of wire against the component to form a lead on the component which contacts the conductive film.

2. An apparatus for forming a lead on a thin film component which has a hole formed therethrough and a conductive film on a surface thereof, comprising:
   - means for supporting a component;
   - wire feeding means for feeding one end of a conductive strand through the hole;
   - a bending tool having an anvil surface for engaging and bending the one end of the conductive strand against the surface of the component;
   - means for severing the trailing conductive strand to form a length of strand extending from the component which is greater than the distance from the hole to one edge of the component; and
   - means operated while the bending tool is still in engagement with the one end of the conductive strand for bending the severed length of strand against the surface to form a lead which extends from the one edge of the component and contacts the conductive film on the component.

3. An apparatus for inserting and fastening a lead to a film component having a hole formed therethrough and a conductive film on one surface thereof adjacent to the hole comprising:
   - means for receiving and supporting the component;
   - a wire feeding and bending member having means for gripping a wire such that a first end of the wire extends from the face of the member;

means for advancing and retracting the member relative to the component supporting means such that upon the first advancement thereof, the first end of the wire is inserted through the hole in the component and extends from the one surface of the component;

means for bending and holding the first end of the wire against the conductive film on the one surface of the component;

means actuated upon the retraction of the member after the first advancement thereof for (1) severing a length of wire substantially greater than the distance from the hole to a predetermined edge of the component, and (2) bending the end of the severed length of wire away from the face of the member such that upon a second advancement of the member, the face of the member engages and bends the severed length of wire against the surface of the component to form a lead which extends from the component.

4. An apparatus for inserting and fastening a pair of leads to a film component having a pair of parallel holes formed therethrough and a pair of conductive films on one surface thereof, each adjacent to a respective hole, comprising:

means for receiving and supporting the component;

a wire feeding and bending member having means for gripping a pair of wires such that first ends of the wires extend parallel from a face of the member;

means for advancing and retracting the member relative to the receiving and supporting means such that upon the first advancement thereof the first ends of the wires are inserted through the holes in the component and extend from the one surface of the component;

means for bending and holding the first ends of the wires against respective conductive films on the one surface of the component; and means actuated upon the retraction of the member after the first advancement thereof for (1) severing lengths of wire substantially greater than the distances from the respective holes to predetermined edges of the component and (2) bending the ends of the severed lengths of wire away from the face of the member such that upon a second advancement of the member the face of the member engages and bends the severed lengths of wire against the surface of the component to form a pair of leads which extend from the component.

5. An apparatus as defined in claim 3 wherein the severing and bending means includes a shearing tool which first severs the wire and then bends the end of the severed wire away from the face of the member.

6. An apparatus as defined in claim 3 which includes:

means for feeding the component in a predetermined orientation to the receiving and supporting means, and wherein the receiving and supporting means includes:

a finger for holding the component in the receiving and supporting means; and means for sensing the position of the finger to reject the component when the first end of the wire fails to enter the hole in the component and moves the component against the finger.

7. An apparatus as defined in claim 3 wherein the wire feeding and bending member comprises:

a slidable block having (1) a passageway extending therethrough such that the wire passes through the passageway and extends from the face of the block, and (2) a groove in the face of the block adjacent to the passageway such that upon the second advancement of the wire feeding and bending member, the severed length of wire is received within the groove to guide and bend the severed length of wire until the face of the member engages and bends the severed length of wire against the component to form a lead.

8. An apparatus for fastening a lead to a film component which has a hole formed therethrough and a conductive film on a surface thereof, comprising:

a positioning block having means for holding a component;

means for serially feeding components in a predetermined orientation to the positioning block;

a reciprocally mounted carriage having friction means for retarding reciprocal movement thereof between initial and advanced positions;

an L-shaped arm pivotally mounted on the carriage;

first and second stops on the carriage for limiting the pivotal movement of the arm;

a pin fastened to a first end of the arm for insertion into the hole of a component in the positioning block when the carriage is in its initial position and the arm is moved against the first stop;

a lead fastening mechanism including (1) means for receiving a component, and (2) means for fastening a lead to the component; and means for applying a reciprocating force to the second end of the arm on the carriage such that (1) the arm is pivoted against the first stop to insert the pin on the first end of the arm into the hole in the component, (2) then the carriage is moved to transfer the component from the block to the receiving means of the lead fastening mechanism, (3) whereupon the arm is pivoted against the second stop to withdraw the pin on the arm from the hole in the component, and (4) finally the carriage is returned to its initial position.

9. An apparatus as defined in claim 8 wherein the holding means on the positioning block includes:

a movable stop on the positioning block in the path of the components being fed by the component feeding means;

first and second passageways in the positioning block, each forming an opening in the block such that the leading component is positioned over the first passageway opening and a component trailing the leading component is positioned over the second passageway opening;

means for applying a vacuum to the first and second passageways to hold the respective components in their positions on the block until the arm is pivoted to insert the pin into the hole of the leading component whereupon (1) the vacuum is released from the first passageway to allow the transfer of the leading component from the positioning block, and (2) the vacuum is released from the second passageway to allow the advancement of the next leading component against the movable stop on the positioning block.

References Cited

UNITED STATES PATENTS

| | | | |
|---|---|---|---|
| 3,141,492 | 7/1964 | Petree et al. | 72—326 |
| 3,200,481 | 8/1965 | Lenders | 29—203 |
| 3,341,926 | 9/1967 | Durr et al. | 29—203 |

JOHN F. CAMPBELL, *Primary Examiner.*

J. L. CLINE, *Assistant Examiner.*

U.S. Cl. X.R.

29—621